United States Patent [19]
Mutz

[11] Patent Number: 5,561,721
[45] Date of Patent: Oct. 1, 1996

[54] METHOD FOR ENHANCING BINARY-RENDERED GRAPHICS AND TEXT FOR MULTI-LEVEL PRINTING

[75] Inventor: Andrew H. Mutz, Penfield, N.Y.

[73] Assignee: Eastman Kodak Company, Rochester, N.Y.

[21] Appl. No.: 390,154

[22] Filed: Feb. 16, 1995

Related U.S. Application Data

[63] Continuation of Ser. No. 145,448, Oct. 29, 1993, abandoned.

[51] Int. Cl.$^6$ ........................................................ G06K 9/56
[52] U.S. Cl. ................................................ 382/205; 382/269
[58] Field of Search .................................... 382/268, 269, 382/205, 272; 358/466, 447, 454, 455

[56] References Cited

U.S. PATENT DOCUMENTS

| | | | |
|---|---|---|---|
| 3,969,716 | 7/1976 | Roberts | 345/136 |
| 4,486,785 | 12/1984 | Lasher et al. | 345/136 |
| 4,771,471 | 9/1988 | Kitamura | 382/269 |
| 4,827,533 | 5/1989 | Tanaka | 382/54 |
| 4,851,825 | 7/1989 | Naiman | 345/136 |
| 4,873,515 | 10/1989 | Dickson et al. | 345/136 |
| 5,031,227 | 7/1991 | Raasch et al. | 382/22 |
| 5,140,315 | 8/1992 | Edelson et al. | 345/136 |
| 5,271,064 | 12/1993 | Dhawan et al. | 382/27 |
| 5,404,233 | 4/1995 | Nagata et al. | 382/269 |
| 5,450,531 | 9/1995 | Ng et al. | 382/269 |

*Primary Examiner*—Joseph Mancuso
*Assistant Examiner*—Jayanti K. Patel
*Attorney, Agent, or Firm*—Thomas H. Close

[57] ABSTRACT

A method of enhancing a digital image by comparing the value of a pixel in the digital image with neighboring pixels in an L-shaped pattern of pixels, and modifying the value of the pixel when it is located at a stair step, thereby reducing the appearance of jaggies.

4 Claims, 2 Drawing Sheets

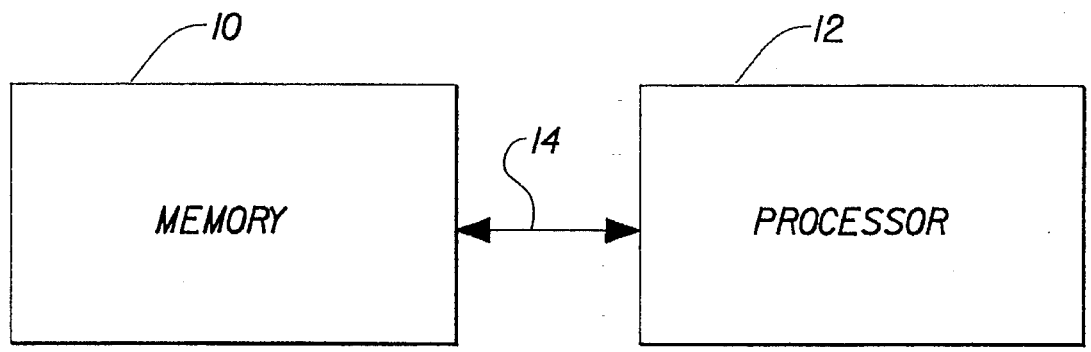
FIG. 1
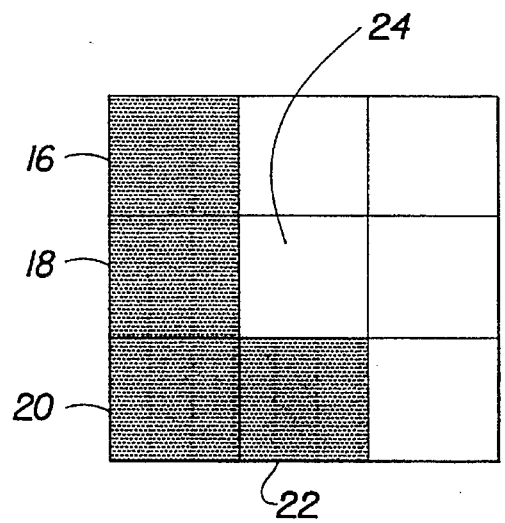
FIG. 2
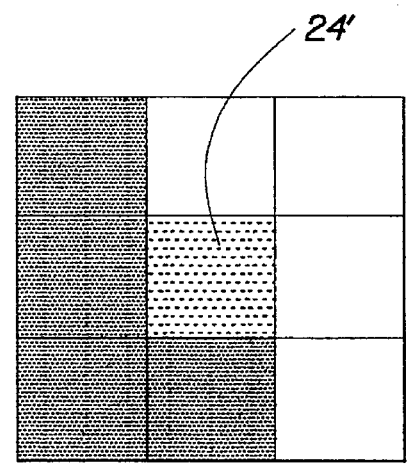
FIG. 3
| UL | U | UR |
| L | P | R |
| DL | D | DR |
FIG. 4

METHOD FOR ENHANCING BINARY-RENDERED GRAPHICS AND TEXT FOR MULTI-LEVEL PRINTING

This is a Continuation of application Ser. No. 08/145,448, filed Oct. 29, 1993 now abandoned.

FIELD OF INVENTION

The present invention relates to digital image processing and more particularly to a method for enhancing the appearance of multi-level digital images.

BACKGROUND OF THE INVENTION

When text and or graphics in a multilevel digital image is generated by binary rendering (i.e. only 2 levels of brightness), lines which are neither perfectly horizontal nor vertical are rendered as a succession of vertical and horizontal line segments or pixel patterns. These patterns are commonly known as jaggies or stair steps and degrade the appearance of the text or graphics. It is known that when binary typefonts are displayed on multilevel display devices, the appearance of the type fonts can be improved by placing intermediate gray level pixels at the stair step locations. In the binary laser printer industry, methods to reduce the visibility of "jaggies" are referred to as "Resolution Enhancement Technologies" in reference to Hewlett-Packard's products. This type of defect is also referred to as "aliasing", and the techniques to ameliorate it as "anti-aliasing".

Binary rendering refers to the practice of assigning one of only two possible values to each pixel in an image. Graphics and fonts may be rendered in a binary means for output on a multi-level device, creating the appearance of stair steps. This practice is common among page description language interpreters for color multi-level output devices.

One method to reduce the appearance of stair steps is the application of a digital blur, or low-pass filter, to the digital image. This has the effect of degrading the sharpness of the image without regard for the image content.

There is a need for a method which reduces the appearance of stair steps without degrading the appearance of sharpness in the image without a prior knowledge of the image content.

SUMMARY OF THE INVENTION

The present invention is directed to overcoming one or more of the problems set forth above. Briefly summarized, according to one aspect of the present invention, the invention consists of a method for locating image features which correspond to stair steps, and modifying the values of pixels only at the stair steps to decrease the appearance of stair steps in the digital image. This method operates by performing a sequence of logical operations on the pixels in the neighborhood of each pixel to determine whether a stair step exists at the pixel. If a stair step is determined to exist at this pixel location, the value of the pixel is modified to a value intermediate to the value of the pixel and the value of the neighboring pixels.

The present invention is advantageous in that features and edges not involving stair steps are retained unchanged, while the appearance of stair steps in the image is reduced. This invention is superior to a blur filter since a blur filter also blurs features and edges which are not stair steps.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a schematic diagram showing digital image processing apparatus useful in practicing the method of the present invention.

FIG. 2 is a schematic representation of a 3×3 pixel area showing a stair step in a digital image useful in describing the present invention.

FIG. 3 is a schematic representation similar to FIG. 1 showing a modified pixel at the stair step according to the present invention.

FIG. 4 is a schematic diagram labeling pixel locations useful in describing the present invention.

DESCRIPTION OF THE PREFERRED EMBODIMENTS

Figure 5:
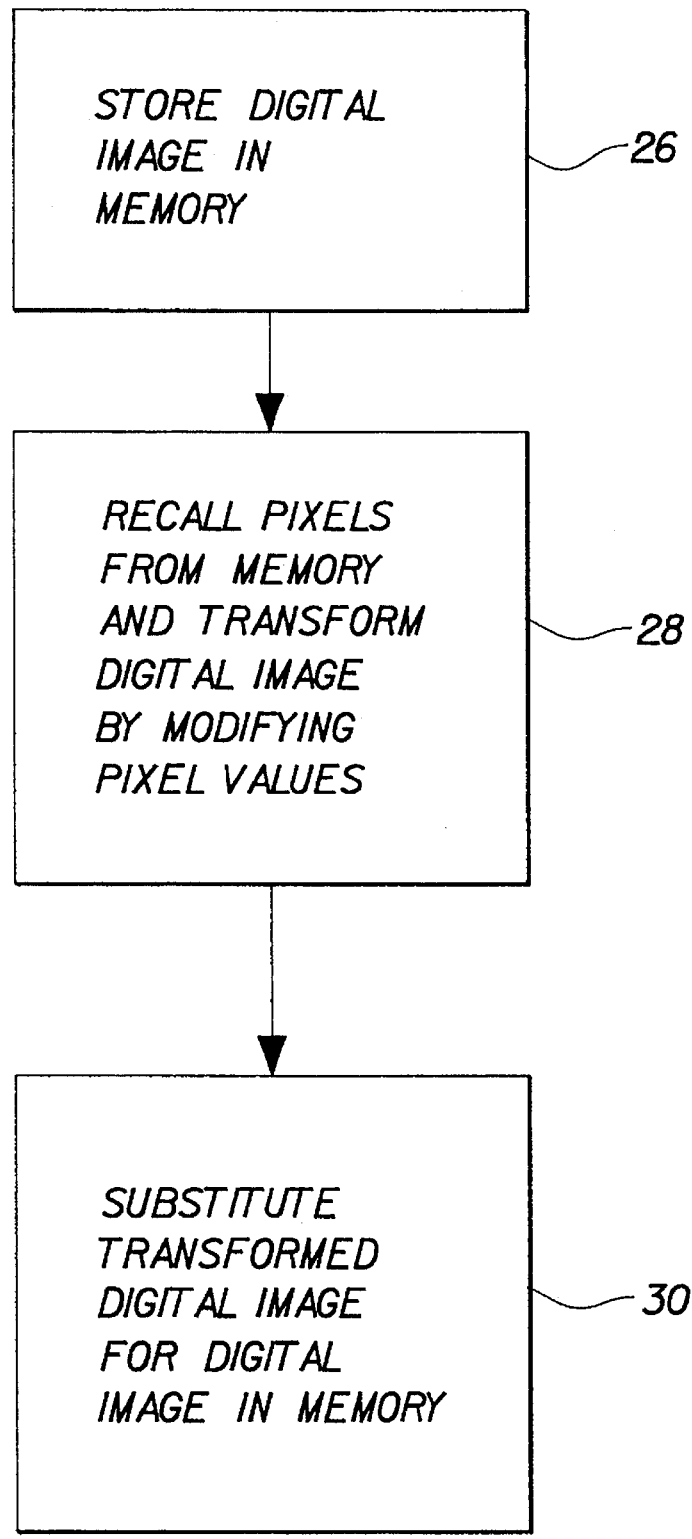
FIG. 5 is a flow chart showing the steps of the present invention.

Referring now to FIG. 1, apparatus for practicing the present invention is shown. The apparatus includes a memory 10 for storing the digital image, a processor 12 for processing the digital image, and a communication link 14 for transferring the digital image between the memory and the processor 12. Processor 12 can be a general purpose digital computer or a special purpose image processing device. Memory 10 can comprise any form of electronic storage including optical, magnetic, and semiconductor memory.

The processor 12 is employed to modify the pixel values in the digital image stored in memory 10 by using a logical pattern search to find the occurrence of stair step features and then modifying the values of the pixels located at the stair steps to reduce the visual noticeability of the stair steps.

The values in the digital memory 10 may represent one or more color components of a color digital image. The method of the present invention may be applied to any one or more of the color components.

FIG. 2 shows a 3×3 pixel array. The logical search pattern employed by the present invention is an L' shaped pattern comprising three pixels 16, 18, and 20, in one direction, and 2 pixels 20 and 22 in an orthogonal direction. When all the pixels 16–22 in this L-shaped pattern are of equal value and the center pixel 24 possesses a different value, the center pixel 24 is said to be located at a stair step. The L-shaped pattern shown in FIG. 2 can be rotated or mirrored to any one of eight positions in the 3×3 pixel array.

When the center pixel is located at a stair step, its value is replaced by an intermediate value between the original center pixel value and the values of the neighboring pixels in the L-shaped pattern.

FIG. 3 shows the result of the image processing described above, wherein the center pixel 24 is replaced by a pixel 24' of intermediate brightness.

The method employed by the processor 12 will now be described with reference to FIG. 4 and 5. In FIG. 4 the pixels are labeled for identification in the following algorithm description implemented by the processor 12.

The image processor 12 selects one pixel at a time and implements the following logical operations:

IF(U!=P & U==L & L==UL & L==UR) then GO

IF(U!=P & U==L & L==UL & U==DL) then GO

IF(U!=P & U==L & L==UR & R==UL) then GO

IF(U!=P & U==R & R==UR & U==DR) then GO

IF(D!=P & D==L & L==DL & L==DR) then GO

IF(D!=P & D==L & L==DL & D==UL) then GO

IF(D!=P & D==R & R==DR & R==DL) then GO

IF(D!=P & D==R & R==DR & D==UR) then GO, where:
- != is an inequality test;
- == is an equality test;
- & is a logical and;
- || is a logical or;
- GO means to modify the current pixel value to the average value of the current pixel value and the value of the pixels in the stair step;
- P is the current pixel value;
- U is the value of the pixel immediately above the current pixel;
- UR is the value of the pixel immediately above and to the right of the current pixel;
- R is the value of the pixel immediately to the right of the current pixel;
- DR is the value of the pixel immediately below and to the right of the current pixel;
- D is the value of the pixel immediately below the current pixel;
- DL is the value of the pixel immediately below and to the left of the current pixel;
- EL is the value of the pixel immediately to the left of the current pixel; and
- UL is the value of the pixel immediately above and to the left of the current pixel.

The above logical sequence is equivalent to searching for each of the eight L-shaped patterns shown in one configuration in FIG. 2.

The above sequence is performed on every pixel sequentially, but the new values of the center pixels may not be assigned until after all pixels neighboring the center pixel are also tested in the above manner.

This sequence of logical operations may be more efficiently organized as follows:

```
IF  (U!=P) then
        IF(U==L&L==UL&(L==UR||U==DL)) then GO
        IF(U==R&R==UR&(R==UL||U==DR)) then GO
IF  (D!=P) then
        IF(D==L&L==DL&(L==DR||D==UL)) then GO
        IF(D==R&R==DR&(R==DL||D==UR)) then GO,
``` where in the above description the indented tests are only performed if the above non-indented condition applies.

The second embodiment differs in that an additional constraint is placed upon the logical search. In addition to the above conditions, the added condition that the two remaining nearest neighbor pixels (where the nearest neighbor pixels consist of the pixels immediately above, below, to the right, and to the left of the center pixel) have the same value as the center pixel. This additional condition prevents a pixel which is the termination of a one pixel wide feature from being modified.

This embodiment may be expressed in the notation above in the following manner:

```
IF  (U!=P&D==P&(R==P||L==P)) then
        IF(U==L&L==UL&(L==UR||U==DL)) then GO
        IF(U==R&R==UR&(R==UL||U==DR)) then GO
IF  (D!=P&U==P&(R==P||L==P)) then
        IF(D==L&L==DL&(L==DR||D==UL)) then GO
        IF(D==R&R==DR&(R==DL||D==UR)) then GO.
```

The third embodiment is similar in intent to the second embodiment. The prevention of fine feature erosion is enabled. The condition, in addition to those of the first embodiment, is that neither of the two remaining nearest neighbor pixels have the same value as those in the L-shaped pattern.

This embodiment may be expressed in the notation above in the following manner:

```
IF  (U!=P&R!=L&U!=D) then
        IF(U==L&L==UL&(L==UR||U==DL)) then GO
        IF(U==R&R==UR&(R==UL||U==DR)) then GO
IF  (D!=P&R!=L&U!=D) then
        IF(D==L&L==DL&(L==DR||D==UL)) then GO
        IF(D==R&R==DR&(R==DL||D==UR)) then GO.
```

The fourth embodiment represents a relaxation of the conditions for equality and inequality described in the first three embodiments, and is intended to allow for the anti-aliasing of text and graphics in the case where the color or shade of the background and/or the foreground varies slowly spatially relative to the spatial variation between the foreground feature and the background. This is a common feature of presentation graphics. In this embodiment, the equality condition is that the four neighboring pixels in the L-shaped pattern be within a specified range of each other, and the absolute difference between the center pixel and the pixels in the L-shaped pattern be larger than a second specified range which is greater than or equal to the first specified range. This embodiment may be further extended to the second and third embodiments described above.

To implement this embodiment, the following definition changes are applied to any of the above three embodiments:
== is redefined as possessing an absolute difference less than a specified constant T. A value of one sixteenth the maximum difference was found to be practically useful. != is redefined as possessing an absolute difference greater than a specified constant Q, where Q is greater than or equal to T. A value of one eight the maximum difference was found to be practically useful.

FIG. 5 shows the steps employed in the method according to the present invention. The digital image is stored in a memory (26). Pixels are recalled from the memory, and pixels Located at a stair step are modified (28). Finally, the transformed digital image is substituted for the original image in the memory (30).

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A method of enhancing a grayscale digital image having pixels with three or more possible grayscale levels, said grayscale digital image being represented as an N×M array of multilevel pixel elements having respective gray scale values V where V represents any one of the three or more grayscale levels for a given pixel, comprising the steps of:

a. storing said grayscale digital image in a memory;
b. transforming said grayscale digital image by performing the following sequence of logical operations on the pixel elements to produce a transformed digital image:

IF $(U!=P\&D==P\&(R==P\|L==P))$ then

IF $(U==L\&L==UL\&(L==UR\|U==DL))$ then $$\text{replace } P \text{ with } \frac{P+U}{2}$$

IF $(U==R\&R==UR\&(R==UL\|U==DR))$ then $$\text{replace } P \text{ with } \frac{P+U}{2}$$

IF $(D!=P\&U==P\&(R==P\|L==P))$ then

IF $(D==L\&L==DL\&(L==DR\|D==UL))$ then $$\text{replace } P \text{ with } \frac{P+D}{2}$$

IF $(D==R\&R==DR\&(R==DL\|D==UR))$ then $$\text{replace } P \text{ with } \frac{P+D}{2},$$

where: "IF()then" is a conditional operation that functions as follows: if the logical statement in the parenthesis is true, the indented operation(s) following "then" is performed, if the logical statement in the parenthesis is false, the indented operation(s) following "then" are skipped and the next "IF()then" operation is performed;

!= is an inequality test that is true when the pixel values immediately preceding and following the symbol for the test are not equal;
== is an equality test that is true when the pixel values immediately preceding and following the symbol for the test are equal;
& is a logical and;
|| is a logical or;
P is the current pixel value;
U is the value of the pixel immediately above the current pixel;
UR is the value of the pixel immediately above .end to the right of the current pixel;
R is the value of the pixel immediately to the right of the current pixel;
DR is the value of the pixel immediately below and to the right of the current pixel;
D is the value of the pixel immediately below the current pixel;
DL is the value of the pixel immediately below and to the left of the current pixel;
L is the value of the pixel immediately to the left of the current pixel; and
UL is the value of the pixel immediately above and to the left of the current pixel; and
c. substituting said transformed digital image for said grayscale digital image in said memory.

2. The method claimed in claim 2, wherein != is a modified inequality test that is true when the absolute difference between the pixel values immediately preceding and following the symbol for the test is greater than Q, and == is a modified equality test that is true when the absolute difference between the pixel values immediately preceding and following the symbol for the test is less than T and wherein T and Q are preselected constants where T is≦Q.

3. A method of enhancing a grayscale digital image having pixels with three or more possible grayscale levels, said grayscale digital image being represented as an N×M array of multilevel pixel elements having respective gray scale value V, where V may represent any one of the three or more grayscale levels for a given pixel, comprising the steps of:

a. storing said grayscale digital image in a memory;
b. transforming said grayscale digital image by performing the following sequence of logical operations on the pixel elements to produce a transformed digital image:

IF $(U!=P\&R!=L\&U!=D)$ then

IF $(U==L\&L==UL\&(L==UR\|U==DL))$ then $$\text{replace } P \text{ with } \frac{P+U}{2}$$

IF $(U==R\&R==UR\&(R==UL\|U==DR))$ then $$\text{replace } P \text{ with } \frac{P+U}{2}$$

IF $(D!=P\&R!=L\&U!=D)$ then

IF $(D==L\&L==DL\&(L==DR\|D==UL))$ then $$\text{replace } P \text{ with } \frac{P+D}{2}$$

IF $(D==R\&R==DR\&(R==DL\|D==UR))$ then $$\text{replace } P \text{ with } \frac{P+D}{2},$$

where: "IF()then" is a conditional operation that functions as follows: if the logical statement in the parenthesis is true, the indented operation(s) following "then" is performed, if the logical statement in the parenthesis is false, the indented operation(s) following "then" are skipped and the next "IF()then" operation is performed;

!= is an inequality test that is true when the values of the pixels immediately preceding and following the symbol for the test are not equal;
== is an equality test that is true when the values of the pixels immediately preceding and following the symbol for the test are equal;
& is a logical and;
|| is a logical or;
P is the current pixel value;
U is the value of the pixel immediately above the current pixel;
UR is the value of the pixel immediately above and to the right of the current pixel;
R is the value of the pixel immediately to the right of the current pixel;
DR is the value of the pixel immediately below and to the right of the current pixel;
D is the value of the pixel immediately below the current pixel;
DL is the value of the pixel immediately below and to the left of the current pixel;
L is the value of the pixel immediately to the left of the current pixel ;and UL is the value of the pixel immediately above and to the left of the current pixel; and c. substituting said transformed digital image for said grayscale digital image in said memory.

4. The method claimed in claim 3, wherein != is a modified inequality test that is true when the absolute difference between the pixel values immediately preceding and following the symbol for the test is greater than Q, and == is a modified equality test that is true when the absolute difference between the pixel values immediately preceding and following the symbol for the test is less than T and wherein T and Q are preselected constants where T is ≦ Q.

* * * * *